US012112252B1

(12) United States Patent
Chen et al.

(10) Patent No.: US 12,112,252 B1
(45) Date of Patent: Oct. 8, 2024

(54) ENHANCED BRAND MATCHING USING MULTI-LAYER MACHINE LEARNING

(71) Applicant: Amazon Technologies, Inc., Seattle, WA (US)

(72) Inventors: Xianshun Chen, Seattle, WA (US); Archiman Dutta, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 726 days.

(21) Appl. No.: 17/327,422

(22) Filed: May 21, 2021

(51) Int. Cl.
*G06N 3/045* (2023.01)
*G06F 18/22* (2023.01)
*G06V 30/19* (2022.01)

(52) U.S. Cl.
CPC ............. *G06N 3/045* (2023.01); *G06F 18/22* (2023.01); *G06V 30/19013* (2022.01)

(58) Field of Classification Search
CPC ........ G06N 3/045; G06N 3/02; G06N 3/0499; G06F 18/22; G06V 30/19013
See application file for complete search history.

(56) References Cited

U.S. PATENT DOCUMENTS

| | | | | |
|---|---|---|---|---|
| 9,633,268 B1 * | 4/2017 | Ma | ........................ | G06V 10/454 |
| 11,783,165 B1 * | 10/2023 | Gebre | .................... | G06N 3/084 |
| | | | | 706/16 |
| 2017/0098141 A1 * | 4/2017 | Wang | ....................... | G06F 18/24 |
| 2017/0357877 A1 * | 12/2017 | Lin | ......................... | G06V 20/47 |
| 2019/0251446 A1 * | 8/2019 | Fang | ....................... | G06N 3/084 |
| 2020/0167772 A1 * | 5/2020 | Chakraborty | ........ | G06V 10/776 |
| 2020/0334519 A1 * | 10/2020 | Georgakis | ................ | G06N 3/08 |
| 2021/0055737 A1 * | 2/2021 | Saleem | ................... | G06V 10/82 |
| 2021/0089892 A1 * | 3/2021 | Kulkarni | ................. | E21B 41/00 |
| 2022/0015657 A1 * | 1/2022 | Ispir | ......................... | A61B 5/16 |
| 2022/0222470 A1 * | 7/2022 | Hropak | .................. | G06V 20/41 |
| 2022/0224683 A1 * | 7/2022 | Solano Gomez | ...... | G06N 20/00 |
| 2022/0230216 A1 * | 7/2022 | Buibas | ................. | G06V 10/454 |

* cited by examiner

*Primary Examiner* — Solomon G Bezuayehu
(74) *Attorney, Agent, or Firm* — Eversheds Sutherland (US) LLP

(57) ABSTRACT

Devices, systems, and methods are provided for brand matching using multi-layer machine learning. A method may include generating, based on a first embedding vector and a second embedding vector as inputs to a twin neural network, a third embedding vector and a fourth embedding vector; generating, based on the first embedding vector and the second embedding vector as inputs to a difference neural network, a difference vector indicative of a difference between the first embedding vector and the second embedding vector; generating a concatenated vector by concatenating the third embedding vector with the fourth embedding vector and the difference vector; generating, based on the concatenated vector as an input to a feedforward neural network (FFN), a score between zero and one, the score indicative of a relationship between a first entity and a second entity.

20 Claims, 9 Drawing Sheets

ENHANCED BRAND MATCHING USING MULTI-LAYER MACHINE LEARNING

BACKGROUND

Machine learning increasingly is being used to match items to one another. However, sometimes inputs to a machine learning model result in a duplication problem in which a product may not be mapped to a matching entity because an input may include two entities that may be duplicates of one another.

Figure 1:
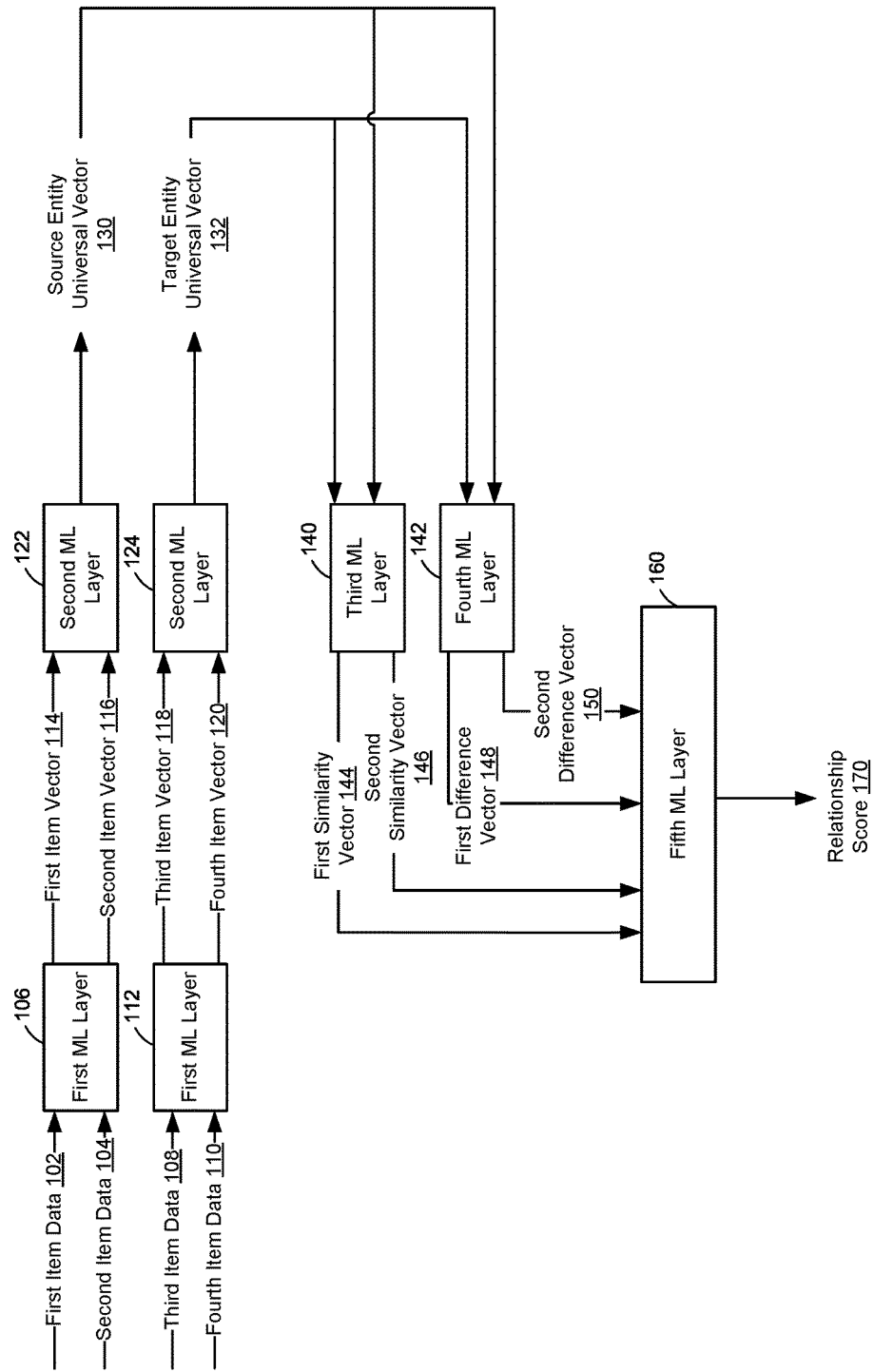
FIG. 1 illustrates an example system for brand matching using multi-layer machine learning, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for brand matching using multi-layer machine learning.

Machine learning (ML) may be used to match products to entities, such as in brand matching. For example, for a given product, computer applications may use ML to determine the brand of the product. However, multiple products may have the same brand; multiple products may have a same seller or provider, and/or may be the same products in different parts of the world using different titles, descriptions, and the like in different languages. Some computer applications use brand matching to group products into clusters known as an entity (e.g., brand entity for brand matching), for example.

Some brand matching and other product matching techniques may use an ML matching model for products, brands, providers, and the like, but do not resolve a brand (or other similar) duplication problem and a brand (or other similar) classification problem. In the brand duplication problem, the input may include two brand entities, each including one or more products, which might or might not be duplicated. In the brand classification problem, the input may include a product and a list of brand entities, in which the product may or may not be mapped to one of the brand entities.

Developing a high-precision and high-recall brand matching model may be challenging because a matching entity may need to be sufficiently generalized to work well for a global brand whose products might come from many heterogeneous data sources (e.g., different product/brand catalogs, different geographic locations, and in multiple languages), and the ML model may need to learn the seemingly ambiguous meaning of the brands (e.g., homonym—where the brands share the same name but are not the same brand, parent-child/umbrella brand relationship, same-brand relationship, etc.) in the brand and product text information at the same time. The brand matching may need to address a variable number of sample products for any brand that changes over time, which may result in a multi-instance learning problem. Existing brand entities may only have sparse product coverage for any brand, for example, due to the limited number of sample product available in a brand and the limited representativeness of the information within the sample products.

There is therefore a need for an enhanced ML model to match products to brands.

In one or more embodiments, the enhanced ML model may use multiple ML layers, such as an SBERT layer sentence analysis, deep averaging layer to analyze SBERT layer outputs, and a combination of twin neural networks and difference neural networks to analyze deep averaging layer outputs for similarities and differences, respectively. The outputs of the ML layers (e.g., feature vectors) may be inputs to a concatenation block (e.g., as opposed to being subtracted from one another), and a concatenated vector of the output feature vectors may be fed into a convolutional network and sigmoid to produce an output score indicative of the similarity of the items being analyzed (e.g., products, brands, etc.). In this manner, the enhanced ML model may analyze the similarity and difference of multiple product properties (e.g., item name, description, brand name, etc.) and may aggregate the similarity and difference data to produce a single probability of how likely the products as a whole are similar, rather than computing separate probabilities for whether the item names are similar, descriptions are similar, etc. For example, a brand may represent an entity. The multi-layer ML model may generate universal entity vectors (e.g., source and target entities) to be inputs to both a twin neural network layer and to a difference neural network layer, and the respective outputs of the twin neural network layer and the difference neural network layer may be concatenated and analyzed for relationships. For example, a relationship may indicate that multiple entities are integrated, that there is a parent-child/umbrella relationship between the entities (e.g., "Kindle" being a brand under the Amazon umbrella), that the entities are homonyms (e.g., the same name, but different entities), that the entities are the same (e.g., their products fall under the same brand), and the like. When the entities refer to brands, the brands may be related to one another or unrelated (e.g., sharing the same or similar names).

In one or more embodiments, the enhanced ML model may use a Cross-Lingual Inference Model for Brands (or other entities) that may include a deep learning network solution that extracts information from product text and images for cross-lingual brand or other entity matching, and that leverages specialized representation learning techniques designed for brand or other entity matching. The deep learning ML model may have a hierarchical architecture built from hybrid blocks of (e.g., XLM-SBERT+Deep Averaging Network+Siamese Network+Difference Network). The deep learning ML model may leverage multi-instance learning so that it can train a cross-language brand duplication model and brand or other entity classification model with the same neural architecture. The CLIMB ML model may be trained with training data, such as brand or other entity pairs having some product matches and some product mismatches to train the model to identify brand or other entity and product relationships.

In one or more embodiments, during brand duplication, the trained CLIMB model may encode a brand's metadata as well as the textual and image information (e.g., name, description, logo, product image, etc.) of sample products using an XLM-SBERT encoder block (e.g., sentence-based embeddings using cross-language encoding). For example, image embeddings may be represented as image vectors identifying whether content appears in an image. The image vectors for multiple products may be inputs to a Deep Average Network (DAN) that may output a brand image vector indicating whether the image vectors for the products are likely to be products of a same brand. Text embeddings may be represented by product titles describing multiple products, which may be input to a DAN, and the output of the DAN may be a brand title vector indicating whether the products are likely to be products of the same brand. Product names may be inputs to an SBERT ML model that may output product name vectors indicating the presence of words in the product names. The SBERT model may be an SBERT encoder that encodes brand text information, such as brand name, brand representation name, website URL, etc., product textual information, such as product title, description, bullet points, etc. Product image features for the image embeddings may be extracted from an image using image analysis techniques. Any product of a brand may have a variable number of brand representations, and any brand representation may have a variable number of products, and any product may have a variable number of images, text data, etc. The enhanced ML model may use deep averaging to aggregate the embeddings of the different data types as detailed herein to allow for a similarity analysis.

In one or more embodiments, the product name vectors may be inputs to a DAN, which may output a brand name vector indicating whether the product names are likely for the same brand. Product descriptions may be inputs to an SBERT ML model that may output product description vectors indicating the presence of words in the product descriptions. The product description vectors may be inputs to a DAN, which may output a brand description vector indicating whether the product descriptions are likely for the same brand. The DAN may aggregate SBERT vectors for sample products on product attributes, such as item name, product description, etc., resulting in a brand-level item name and brand-level product description, as well as a brand-level brand representation name encoded vector for any brand.

In one or more embodiments, brand name representations may be inputs to an SBERT ML model that may output brand name vectors indicating the presence of words in the brand names. The brand name representation vectors may be inputs to a DAN, which may output a brand name representation vector indicating whether the brand name representations are likely to be for the same brand. This process may be repeated for source products and brands, and for target products and brands. For example, a source product/brand may be sold in one country, and a target product/brand may be sold in another country, and a similarity analysis using ML may identify when the brand for the source product is the same as the brand for the target product. In this manner, by generating a first brand image vector, a first brand title vector, a first brand name vector, and a first brand description vector, the SBERT and DAN models may produce a set of universal source encoding vectors for an entity to compare to a set of universal target encoding vectors for another entity. The target encoding vectors may be generated the same way as described for the source encoding vectors, but using inputs for different products and brands to which to compare to the products and brands of the source encoding vector inputs. For example, a source brand may have multiple products and brand representations, and a target brand may have multiple products and brand representations. The number of sample products and brand representations may vary, solving a problem of multi-instance learning.

In one or more embodiments, the universal source entity encoding vectors may be compared to the corresponding universal target entity encoding vectors to determine a likelihood of whether the products used as inputs are likely to be of the same brand. For example, the first universal brand image vector and a second universal brand image vector of the target encoding vectors may be inputs to a twin neural network, which may output a respective brand image vector for each input, a brand image vector indicating a difference between a target value and the respective input. The first universal brand title vector and a second universal brand title vector of the target encoding vectors may be inputs to a twin neural network, which may output a respective brand title vector for each input, a brand title vector indicating a difference between a target value and the respective input. The first universal brand name vector and a second universal brand name vector of the target encoding vectors may be inputs to a twin neural network, which may output a respective brand name vector for each input, a brand name vector indicating a difference between a target value and the respective input. The first universal brand name vector and the second universal brand name vector may be inputs to a difference network, which may output a brand name difference vector indicating the differences between the inputs. Similarly, the other target and source universal vectors may be inputs to a difference network, resulting in difference vectors for the inputs. The difference vectors may be concatenated with the respective output vectors of the twin neural networks, and the concatenated vectors may be inputs to an ML model that may generate a match output (e.g., between 0 and 1, with 0 indicating that the input products are unlikely to be part of the same brand, and 1 indicating that the input products are likely to be part of the same brand). In this manner, the combination of DANs, twin neural networks, SBERT models, and difference networks using image and text data for products and brands may be used to determine whether any products are of the same brand, or whether there are other relationships between the entities represented by the universal source entity and target entity vectors.

In one or more embodiments, the SBERT model may use an SBERT encoder with a pre-trained cross-language SBERT. The DAN may aggregate the SBERT vectors for sample products on each product attribute, such as title, item name, product description, etc., producing a brand-level title, item name, product description, and brand representation name encoded vector for each brand. The twin neural network may be a shared feedforward neural network (FFN) that may encode outputs of the DAN. The difference network may input outputs from the DAN and pass them through a subtract( ) layer and the FFN. The FFN may concatenate the outputs of the twin neural network and the difference network, and may output a sigmoid activated output signal (e.g., the value from 0-1 indicating a brand match or another entity relationship).

In one or more embodiments, the ML models may be trained using mismatched brand or other entity pairs and strong brand or other entity match pairs to train the ML models to identify strong or weak brand or other entity scores (e.g., from 0-1).

The enhanced ML model may allow for each brand to have variable number of sample products in multiple marketplaces and languages (without limit), thus solve the problem of multi-instance learning. The enhanced ML model may leverage XLM-SBERT (Cross-Language Sentence-BERT) to encode product and brand information in multiple languages, thereby solving a cross-language matching problem. The enhanced ML model may use extensible architecture; any new brand-level or product-level information (e.g., brand logo, manufacturer) may be added via the first layer of encoding (SBERT) and aggregated via the DAN to brand-level embedding, thereby allowing rich information to mitigate sparse products coverage.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for brand matching using multi-layer machine learning, in accordance with one or more example embodiments of the present disclosure.

Referring to FIG. 1, the system 100 may input first item data 102 and second item data 104 into a first ML layer 106 (e.g., an SBERT), and the SBERT may output a first item vector 114 based on the first item data 102 and a second item vector 116 based on the second item data 104. The system 100 may input third item data 108 and fourth item data 110 into a first ML layer 112 (e.g., the same SBERT as or a different SBERT than the first ML layer 106), which may output a third item vector 118 based on the third item data 108 and a fourth item vector 120 based on the fourth item data 110. The first item vector 114 and the second item vector 116 (e.g., embeddings) may be input to a second ML layer 122 (e.g., a DAN), and the third item vector 118 and the fourth item vector 120 (e.g., embeddings) may be input to a second ML layer 124 (e.g., the same DAN as or a different DAN than the second ML layer 122). The second ML layer 122 may output a source entity universal vector 130, and the second ML layer 124 may output a target entity universal vector 132, each of which may be inputs to a third ML layer 140 (e.g., a twin neural network) and to a fourth ML layer 142 (e.g., a difference neural network).

Still referring to FIG. 1, the third ML layer 140 may output a first similarity vector 144 based on the source entity universal vector 130 and a second similarity vector 146 based on the target entity universal vector 132. The fourth ML layer 142 may output a first difference vector 148 based on the source entity universal vector 130 and a second difference vector 150 based on the target entity universal vector 132. A fifth ML layer 160 (e.g., an FFN or other neural network) may concatenate its inputs, which may be vectors (e.g., embeddings) output by the third ML layer 140 and the fourth ML layer 142, including the first similarity vector 144, the second similarity vector 146, a first difference vector 148, the second difference vector 150, and other similarity and difference vectors as disclosed herein. Using the concatenated vector of inputs to the fifth ML layer 160, the fifth ML layer 160 may analyze the data of the vector inputs to generate a relationship score 170 that indicates how likely the items for which the data is analyzed (e.g., the first item data 102, the second item data 104, the third item data 108, the fourth item data 110) are similar to one another (e.g., a 0 being not similar, and a 1 being most similar, with the matching score ranging from 0-1 or some other range). In this manner, rather than determining separate probabilities for whether item data are similar or different, the system 100 aggregates item properties, examples of which are provided herein, to determine a single probability—the relationship score 170—that indicates whether items are similar to one another. As explained further herein, when using product and brand data, the relationship score 170 may facilitate enhanced brand matching. The relationship score may indicate how likely the source and target entities are to be related in one or more ways, such as being the same brand or other type of entity, having a parent-child relationship, being homonyms of one another, and the like. For example, multiple types of relationships may be scored, and the relationship score 170 may indicate which relationship(s) are the most likely to apply to the source and target entities.

In one or more embodiments, the system 100 may be used to analyze multiple products, and may assume that each product has a brand. A brand may have one or multiple products, so the system 100 may be used to determine whether a source brand having one or more products is the same as a target brand having one or more products (e.g., whether the products share the same brand). For example, the first item data 102 may be data for a first product, such as a product name (e.g., a string of characters), a product description (e.g., a string of characters different than the product name and providing information about the product), a brand name (e.g., a string of characters representing a brand used to distinguish the product and possibly other products), a brand representation name (e.g., a string of characters that may be different than the brand name, and/or a logo), and the like. Similarly the second item data 104 may be data for a second product, such as a product name, product description, brand name, brand representation name, etc. The first item data 102 and the second item data 104 may be of the same type (e.g., both a product name, a product description, a brand name, a brand representation name, etc.) for two products. The third item data 108 may represent a different type of data for the first product (e.g., when the first item data 102 is a product name, the third item data 108 may be a product description, etc.), and similarly the fourth item data 110 may represent the same type of data as the third item data 108 (e.g., a different type of data than the second item data 104), but for the second product.

In one or more embodiments, the first ML layer 106 and the first ML layer 112 may include trained SBERT encoders that analyze the character strings of the data inputs. The outputs of the first ML layer 106 and the first ML layer 112 may be sentence-level embeddings in one or multiple languages. For example, the first item vector 114, the second item vector 116, the third item vector 118, and the fourth item vector 120 may include contextualized word embeddings that include vector representations of the input strings. For example, when a product description is, "A product used for embroidering," the first ML layer 106 and/or the first ML layer 112 may tokenize the string using known tokens (e.g., the word "a" may be a known token, but the word "embroidering" may not be a known token). Words that are not known tokens may be represented by sub-words or characters. Each token may be evaluated on a number of features (e.g., hundreds of features), so the first item vector 114, the second item vector 116, the third item vector 118, and the fourth item vector 120 each may be vectors with hundreds of data entries.

In one or more embodiments, the second ML layer 122 and the second ML layer 124 may be DANs that aggregate the outputs of the BERT layers (e.g., the first ML layer 106 and the first ML layer 112, respectively), and may determine vector averages of inputs. For example, the source entity universal vector 130 may be a vector average of the values of the first item vector 114 and the second item vector 116, and the target entity universal vector 132 may be a vector average of the values of the third item vector 118 and the fourth item vector 120. In this manner, the source item entity universal 130 and the target entity universal vector 132 may represent universal embeddings for a "source" brand and a "target" brand, respectively, to use as inputs to the third ML layer 140 and to the fourth ML layer 142.

In one or more embodiments, the third ML layer 140 may be a twin neural network. The inputs to the third ML layer 140 may be the same data type (e.g., the source entity universal vector 130 and the target entity universal vector 132 may represent vector averages of strings of product-related data), and the third ML layer 140 may generate encodings (e.g., the first similarity vector 144, the second similarity vector 146) based on similarities between the source entity universal vector 130 and the target entity universal vector 132.

In one or more embodiments, the fourth ML layer 142 may be a difference neural network. The inputs to the fourth ML layer 142 may be the same data type (e.g., the source entity universal vector 130 and the target entity universal vector 132 may represent vector averages of strings of product-related data), and the fourth ML layer 142 may generate encodings (e.g., the first difference vector 148, the second difference vector 150) based on differences between the source entity universal vector 130 and the target entity universal vector 132. For example, the fourth ML layer 142 may include a subtract layer between the source entity universal vector 130 and the target entity universal vector 132 attribute vectors.

In one or more embodiments, the fifth ML layer 160 may be a FFN that may concatenate its inputs (e.g., the output vectors of the third ML layer 140 and the fourth ML layer 142), and may generate a sigmoid-activated output signal (e.g., the relationship score 170) that indicates whether the source entity universal vector 130 and the target entity universal vector 132 (and the products corresponding to them) are similar and belong to a same brand (e.g., does the source brand match the target brand?). For example, the fifth ML layer 160 may identify when some values of the concatenated vector are similar or different to one another, satisfy criteria indicating similarities, and the like (e.g., whether values satisfy respective thresholds, etc.). The system 100 may be trained with training data that includes both matching source and target brands, and mismatched source and target brands.

Figure 2A:
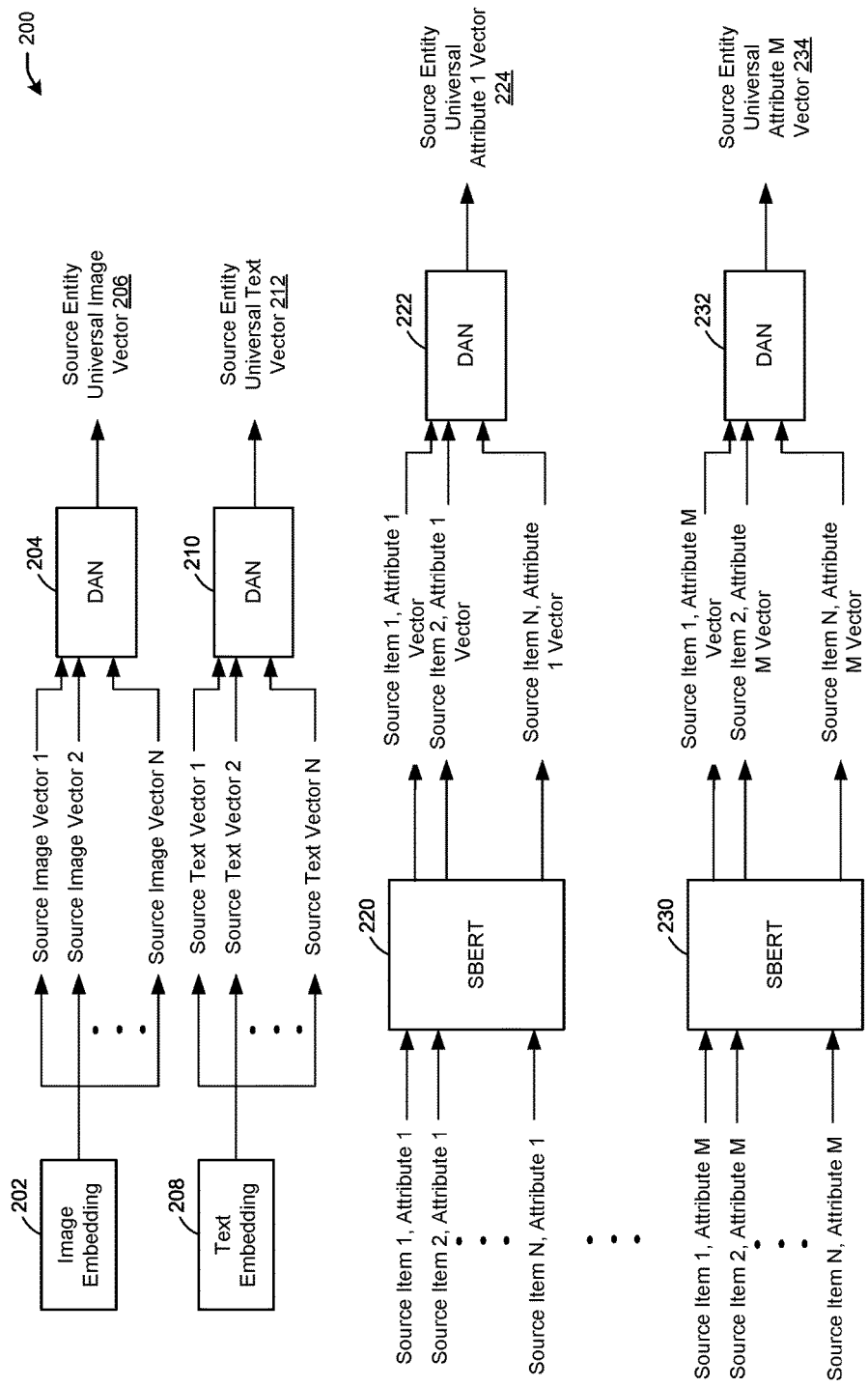
FIG. 2A illustrates an example system for source brand matching using deep averaging neural networking in multi-layer machine learning, in accordance with one or more example embodiments of the present disclosure.

FIG. 2A illustrates an example system 200 for source brand matching using deep averaging neural networking in multi-layer machine learning, in accordance with one or more example embodiments of the present disclosure.

The system 200 may be similar to a portion of the system 100 of FIG. 1, and also may allow for some embeddings to be input to a DAN without requiring an SBERT as explained. Referring to FIG. 2A, the system 200 may include an image embedding 202 (e.g., vectors indicating values of a product-related image, such as color, brightness, etc.). For example, the embedding 202 may include multiple source image vectors (e.g., source image vector 1, source image vector 2, . . . , source image vector N). The image vectors of the image embedding 202 may be generated using an encoding technique (e.g., RESNET residual neural network), and may be inputs to a DAN 204 (e.g., the second ML layers 122 and 124 of FIG. 1), which may generate a source entity universal image vector 206 (e.g., a universal image vector for a "source" product). A text embedding 208 (e.g., including source text vector 1, source text vector 2, . . . , source text vector N, indicating characteristics of product-related text, such as whether a word in the text is similar to other words or matches at word type, etc.) may be an input to DAN 210, which may generate a source entity universal text vector 212 (e.g., a universal image vector for a "source" brand's products).

Still referring to FIG. 2A, source item attributes (e.g., source item 1, attribute 1; source item 2, attribute 1; . . . ; source item N, attribute 1) may be common attributes (e.g., attribute 1 may be a product name, a product description, a brand name, a brand representation name, etc.), and may be inputs to an SBERT 220 (e.g., the first ML layers 106 and 112 of FIG. 1). In this manner, the source item attribute 1 may represent the same attribute for multiple products. The output of the SBERT 220 may be sentence vectors (e.g., source item 1, attribute 1 vector; source item 2, attribute 1 vector; . . . ; source item N, attribute 1 vector), which may be inputs to DAN 222. The DAN 222 may generate a source entity universal attribute 1 vector 224 (e.g., a universal attribute 1 vector for a "source" entities products). Other attributes (e.g., attributes 1-M) for any number of products may be inputs to an SBERT. For example, for an Mth attribute, the inputs to SBERT 230 may include source item 1, attribute M; source item 2, attribute M; . . . ; source item N, attribute M. The SBERT 230 may generate attribute M vectors (source item 1, attribute M vector; source item 2, attribute M vector; . . . ; source item N, attribute M vector), which may be inputs to DAN 232. The DAN 232 may generate a source entity universal attribute M vector 234 (e.g., a universal attribute M vector for a "source" entity's products).

In one or more embodiments, the DAN 204, the DAN 210, the DAN 222, and the DAN 232 may be the same DAN layer or different DAN layers. The SBERT 220 and the SBERT 230 may be the same SBERT layer or different SBERT layers.

In one or more embodiments, the SBERT 220 and the SBERT 230 may include trained SBERT encoders that analyze the character strings of the data inputs. The outputs of the SBERT 220 and the SBERT 230 may be sentence-level embeddings in one or multiple languages (e.g., the source item attribute vectors may include contextualized word embeddings that include vector representations of the input strings).

In one or more embodiments, the DAN 204, the DAN 210, the DAN 222, and the DAN 232 may aggregate the outputs of the SBERT layers, and may determine vector averages of inputs. For example, the source entity universal image vector 206 may be a vector average of the values of the source image vectors, the source universal attribute vectors may be a vector average of the values of the respective source item attribute vector inputs, etc. In this manner, the source universal vectors may represent universal embeddings for a "source" brand to be evaluated for similarities and differences with universal embeddings for a target brand (e.g., as explained further with respect to FIGS. 2B-4).

Figure 2B:
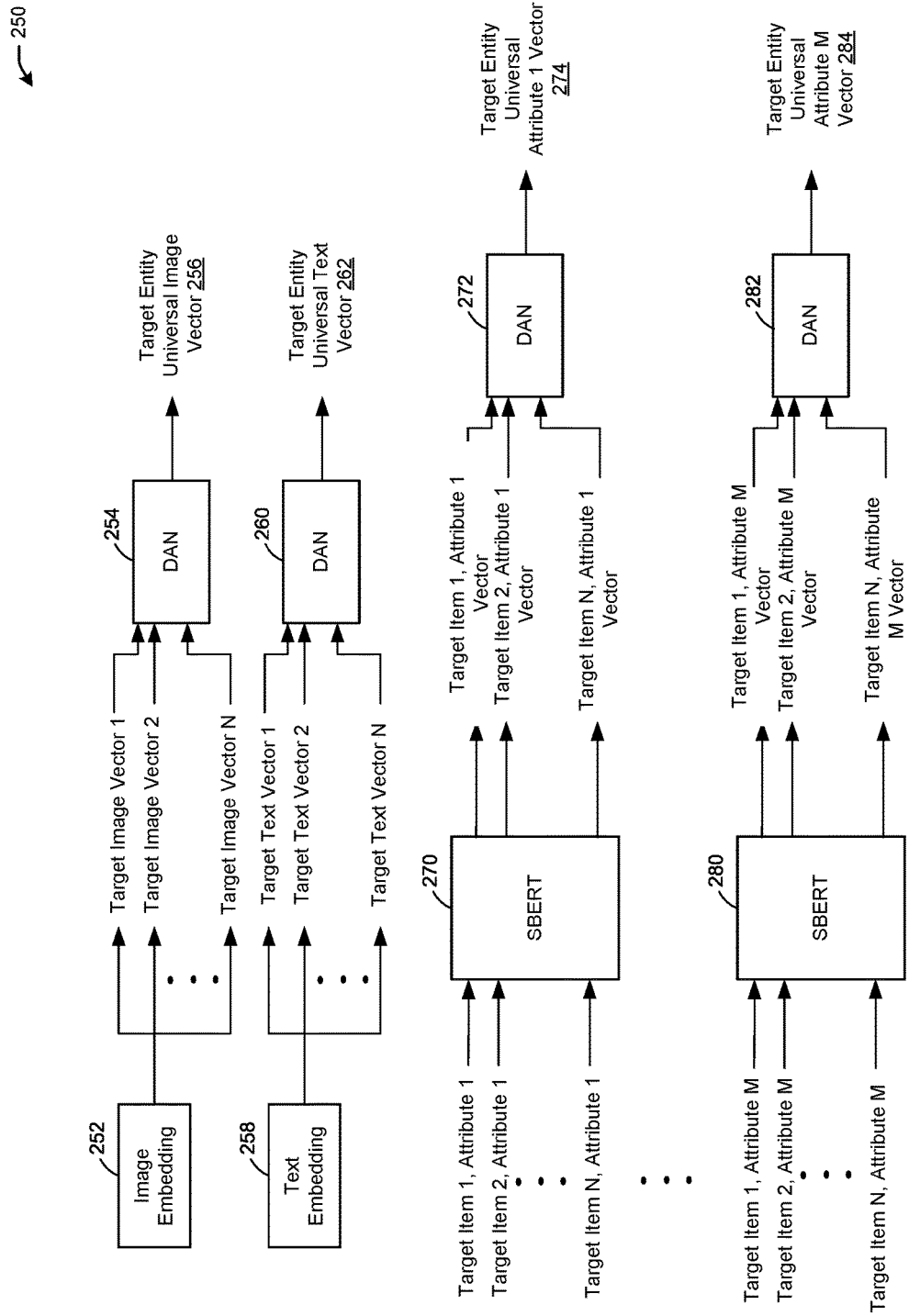
FIG. 2B illustrates an example system for target brand matching using deep averaging neural networking in multi-layer machine learning, in accordance with one or more example embodiments of the present disclosure.

FIG. 2B illustrates an example system 250 for target brand matching using deep averaging neural networking in multi-layer machine learning, in accordance with one or more example embodiments of the present disclosure.

The system 250 may be similar to a portion of the system 100 of FIG. 1, and also may allow for some embeddings to be input to a DAN without requiring an SBERT as explained. Referring to FIG. 2B, the system 250 may include an image embedding 252 (e.g., vectors indicating values of a product-related image, such as color, brightness, etc.). For example, the embedding 252 may include multiple source image vectors (e.g., target image vector 1, target image vector 2, . . . , target image vector N). The image vectors of the image embedding 252 may be generated using an encoding technique (e.g., RESNET) and may be inputs to a DAN 254 (e.g., the second ML layers 122 and 124 of FIG. 1), which may generate a target entity universal image vector 256 (e.g., a universal image vector for a "target" entity's products). A text embedding 258 (e.g., including target text vector 1, target text vector 2, . . . , target text vector N, indicating characteristics of product-related text, such as whether a word in the text is similar to other words or matches at word type, etc.) may be an input to DAN 260, which may generate a target entity universal text vector 262 (e.g., a universal image vector for a "target" entity's products).

Still referring to FIG. 2B, target item attributes (e.g., target item 1, attribute 1; target item 2, attribute 1; . . . ; target item N, attribute 1) may be common attributes (e.g., attribute 1 may be a product name, a product description, a brand name, a brand representation name, etc.), and may be inputs to an SBERT 270 (e.g., the first ML layers 106 and 112 of FIG. 1). In this manner, the target item attribute 1 may represent the same attribute for multiple products. The output of the SBERT 270 may be sentence vectors (e.g., target item 1, attribute 1 vector; target item 2, attribute 1 vector; . . . ; target item N, attribute 1 vector), which may be inputs to DAN 272. The DAN 272 may generate a target universal attribute 1 vector 274 (e.g., a universal attribute 1 vector for a "target" product). Other attributes (e.g., attributes 1-M) for any number of products may be inputs to an SBERT. For example, for an Mth attribute, the inputs to SBERT 280 may include target item 1, attribute M; target item 2, attribute M; . . . ; target item N, attribute M. The SBERT 280 may generate attribute M vectors (target item 1, attribute M vector; target item 2, attribute M vector; . . . ; target item N, attribute M vector), which may be inputs to DAN 282. The DAN 282 may generate a target universal attribute M vector 284 (e.g., a universal attribute M vector for a "target" product).

In one or more embodiments, the DAN 254, the DAN 260, the DAN 272, and the DAN 282 may be the same DAN layer or different DAN layers. The SBERT 270 and the SBERT 280 may be the same SBERT layer or different SBERT layers.

In one or more embodiments, the SBERT 270 and the SBERT 230 may include trained SBERT encoders that analyze the character strings of the data inputs. The outputs of the SBERT 270 and the SBERT 280 may be sentence-level embeddings in one or multiple languages (e.g., the source item attribute vectors may include contextualized word embeddings that include vector representations of the input strings).

In one or more embodiments, the DAN 254, the DAN 260, the DAN 272, and the DAN 282 may aggregate the outputs of the SBERT layers, and may determine vector averages of inputs. For example, the target entity universal image vector 256 may be a vector average of the values of the target image vectors, the target universal attribute vectors may be a vector average of the values of the respective target item attribute vector inputs, etc. In this manner, the target universal vectors may represent universal embeddings for a "target" brand to be evaluated for similarities and differences with universal embeddings for a source brand (e.g., as explained further with respect to FIGS. 3A-4).

Referring to FIGS. 2A and 2B, the source and target universal vectors may be generated by averaging multiple embedding vectors of the same type as shown. For example, when there are four items with embeddings in a brand (e.g., N=4 in FIG. 2A and FIG. 2B), attribute vectors of [0.1, 0.2, . . . ], [0.22, 0.33, . . . ], [0.2, 0.45, . . . ], [0.0, 0.01, . . . ] would result in averages of [(0.1+0.22+0.2+0.0)/4, (0.2+0.33+0.45+0.01)/4, . . . ] [0.13, 0.2475, . . . ] (e.g., a universal attribute vector in FIG. 2A and FIG. 2B).

Still referring to FIGS. 2A and 2B, the attributes 1-M may include an item name (e.g., which may include different item names for different countries in which a product is sold), item descriptions (e.g., which may include different item descriptions for different countries in which a product is sold), brand names (e.g., which may include different brand names for different countries in which a product is sold), and/or different brand representations (e.g., which may include different brand representations for one or multiple countries in which a product is sold). For example, the source item 1, attribute 1 vector of FIG. 2A may be represented by a vector of numbers, each number representing a characteristic of the attribute (e.g., words in an item name, description, brand name, words or image characteristics of a brand representation, etc.). The source and target image and text vectors of FIG. 2B similarly may be represented, and so may the target item attribute vectors of FIG. 2B.

Still referring to FIGS. 2A and 2B, the source universal vectors of FIG. 2A may represent a universal source embedding vector (e.g., a combined vector of the source entity universal image vector 206, the source entity universal text vector 212, the source entity universal attribute 1 vector 224, ..., the source entity universal attribute M vector 234). Similarly, the target universal vectors of FIG. 2B may represent a universal target embedding vector (e.g., a combined vector of the target entity universal image vector 256, the target entity universal text vector 262, the target universal attribute 1 vector 274, ..., the source universal attribute M vector 284). The universal source embedding vector and the universal target embedding vector may be inputs to the twin neural networks of FIG. 3A and to the difference neural networks of FIG. 3B. In this manner, the universal source embedding vector and the universal target embedding vector may include averages of multiple vectors of image and/or text data, including vectors representing different attributes such as item name, item description, brand name, brand representation, etc.

Figure 3A:
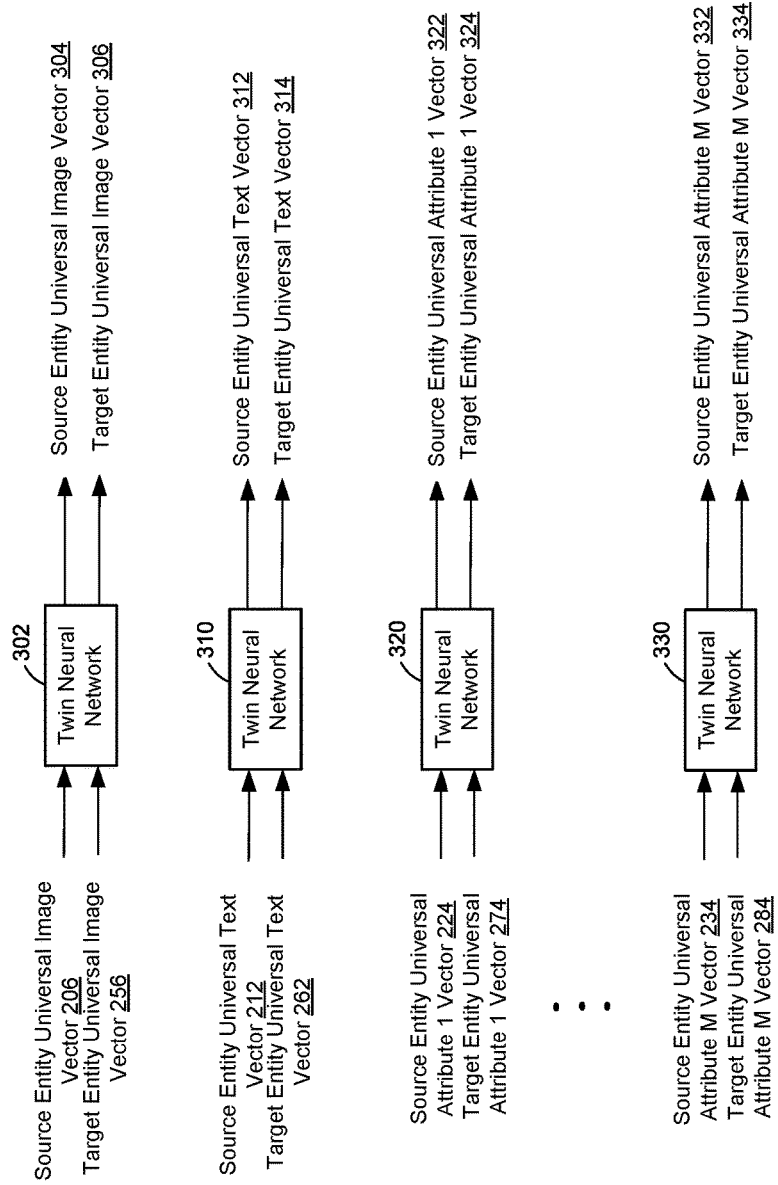
FIG. 3A illustrates an example system for using twin neural networking in multi-layer machine learning to compare source brand information of FIG. 2A to target brand information of FIG. 2B, in accordance with one or more example embodiments of the present disclosure.

FIG. 3A illustrates an example system 300 for using twin neural networking in multi-layer machine learning to compare source brand information of FIG. 2A to target brand information of FIG. 2B, in accordance with one or more example embodiments of the present disclosure.

Referring to FIG. 3A, the source entity universal image vector 206 of FIG. 2A and the target entity universal image vector 256 of FIG. 2B may be inputs to a twin neural network 302. The outputs generated by the twin neural network 302 may include a source entity universal image vector 304 and a target entity universal image vector 306. Other source brand vectors of FIG. 2A and target brand vectors of FIG. 2B may be inputs to twin neural networks, allowing the twin neural networks to analyze the same types of data for the source brand and the target brand for similarities. As shown, the source entity universal text vector 212 of FIG. 2A and the target entity universal text vector 262 of FIG. 2B may be inputs to twin neural network 310, which may generate a source entity universal text vector 312 and a target entity universal text vector 314 as outputs. The source entity universal attribute 1 vector 224 of FIG. 2A and the target universal attribute 1 vector 274 of FIG. 2B may be inputs to a twin neural network 320. The outputs generated by the twin neural network 320 may include a source entity universal attribute 1 vector 322 and a target entity universal attribute 1 vector 324. Other attributes from the source brand and the target brand may be inputs to twin neural networks. For example, for attributes 1-M, the respective source and target universal attribute vectors for a given attribute may be inputs to a twin neural network. As shown, for the Mth attribute, the source entity universal attribute M vector 234 of FIG. 2A and the target universal attribute M vector 284 of FIG. 2B may be inputs to a twin neural network 330, which may generate a source entity universal attribute M vector 332 and a target entity universal attribute M vector 334 as outputs.

In one or more embodiments, the twin neural network 302, the twin neural network 310, the twin neural network 320, and the twin neural network 330 may be a same twin neural network layer, or multiple layers. The twin neural network 302, the twin neural network 310, the twin neural network 320, and the twin neural network 330 may generate encodings (e.g., the source entity universal image vector 304, the target entity universal image vector 306, etc.) based on similarities between the respective inputs to the twin neural networks.

Figure 3B:
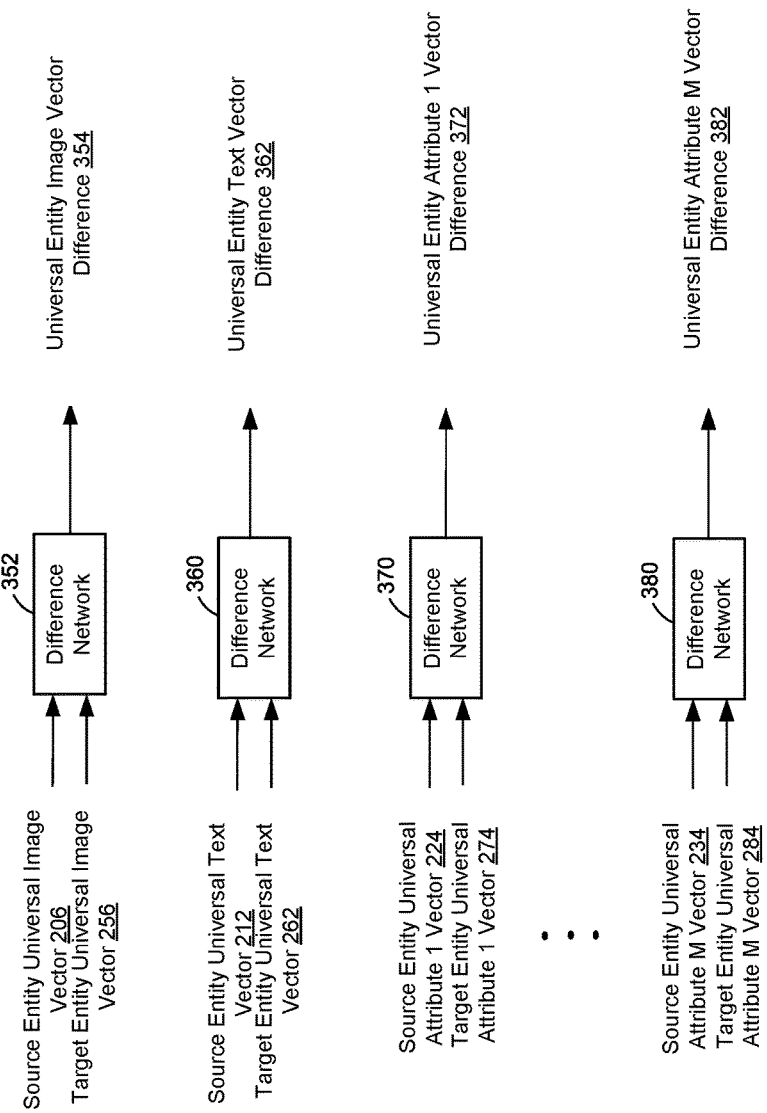
FIG. 3B illustrates an example system for using difference neural networking in multi-layer machine learning to compare source brand information of FIG. 2A to target brand information of FIG. 2B, in accordance with one or more example embodiments of the present disclosure.

FIG. 3B illustrates an example system 350 for using difference neural networking in multi-layer machine learning to compare source brand information of FIG. 2A to target brand information of FIG. 2B, in accordance with one or more example embodiments of the present disclosure.

Referring to FIG. 3B, the source entity universal image vector 206 of FIG. 2A and the target entity universal image vector 256 of FIG. 2B may be inputs to a difference neural network 352. The outputs generated by the difference neural network 352 may include a universal entity image vector difference 354 (e.g., indicative of a difference between the inputs). Other source brand vectors of FIG. 2A and target brand vectors of FIG. 2B may be inputs to difference neural networks, allowing the difference neural networks to analyze the same types of data for the source brand and the target brand for differences. As shown, the source entity universal text vector 212 of FIG. 2A and the target entity universal text vector 262 of FIG. 2B may be inputs to difference neural network 360, which may generate a universal entity text vector difference 362 as an output. The source entity universal attribute 1 vector 224 of FIG. 2A and the target universal attribute 1 vector 274 of FIG. 2B may be inputs to a difference neural network 370. The output generated by the difference neural network 370 may include a universal entity attribute 1 vector difference 372. Other attributes from the source brand and the target brand may be inputs to difference neural networks. For example, for attributes 1-M, the respective source and target universal attribute vectors for a given attribute may be inputs to a difference neural network. As shown, for the Mth attribute, the source entity universal attribute M vector 234 of FIG. 2A and the target universal attribute M vector 284 of FIG. 2B may be inputs to a difference neural network 380, which may generate a universal entity attribute M vector difference 382 as an output. The outputs of the difference neural networks may be indicative of a difference between the respective inputs (e.g., how different the input embeddings are in multiple categories).

In one or more embodiments, the difference neural networks 352, 360, 370, and 380 may be the same layer or multiple layers, and may generate encodings (e.g., the vector differences) based on differences between the source embeddings and the target embeddings. For example, the difference neural networks 352, 360, 370, and 380 may include a subtract layer between a respective source embedding input and a respective target embedding input. In this manner, referring to FIGS. 3A and 3B, the universal embeddings for products of a source brand and products of a target brand may be analyzed for both similarities and differences.

Figure 4:
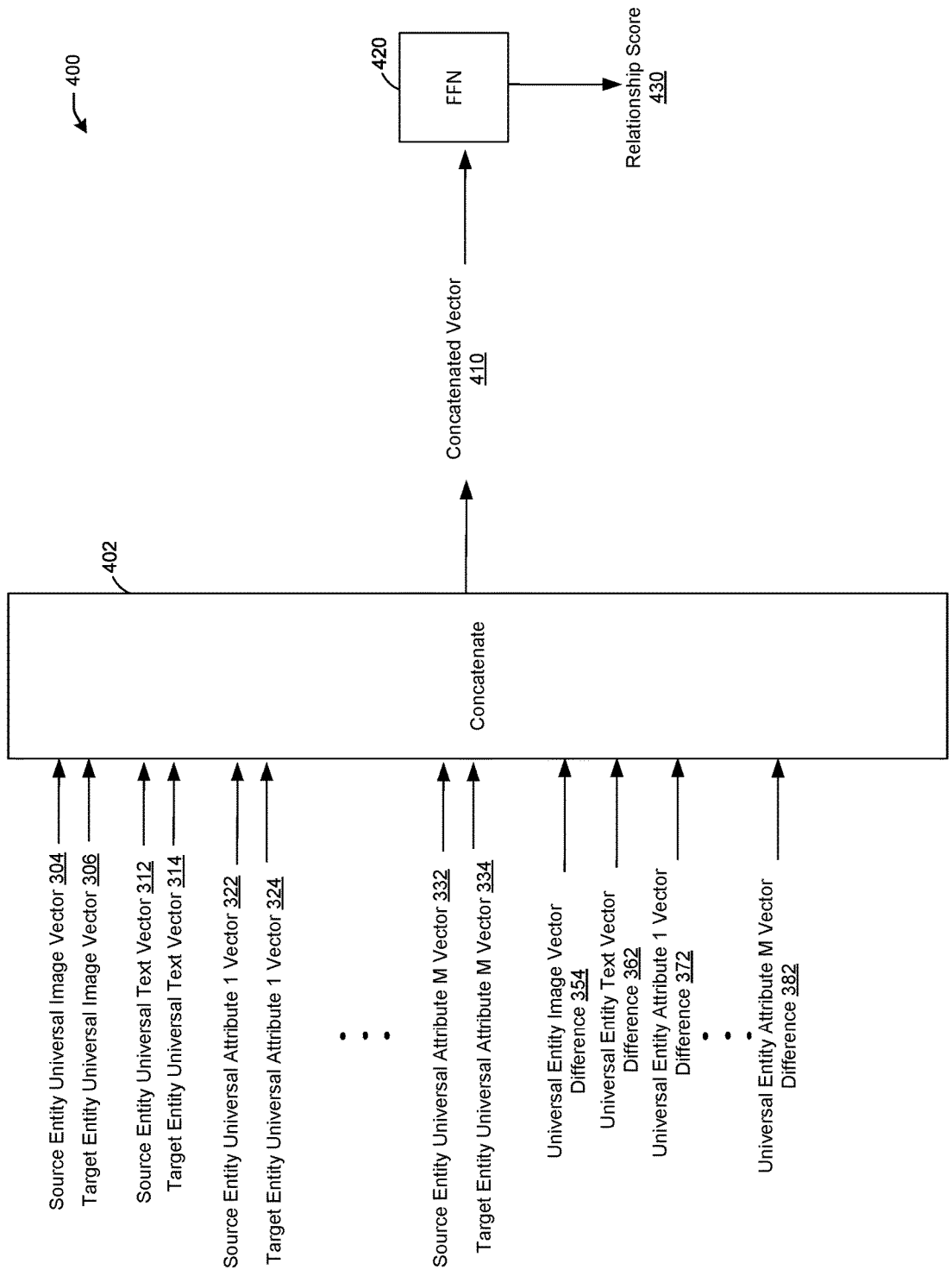
FIG. 4 illustrates an example system of concatenating outputs of the twin neural networking of FIG. 3A to outputs of the difference neural networking of FIG. 3B and generating a match score, in accordance with one or more example embodiments of the present disclosure.

FIG. 4 illustrates an example system 400 of concatenating outputs of the twin neural networking of FIG. 3A to outputs of the difference neural networking of FIG. 3B and generating a match score, in accordance with one or more example embodiments of the present disclosure.

Referring to FIG. 4, the system 400 may receive the outputs of FIGS. 3A and 3B as inputs to a concatenate block. For example, the source entity universal image vector 304, the target entity universal image vector 306, the source entity universal text vector 312, the target entity universal text vector 314, the source and target entity universal attribute vectors (e.g., the source entity universal attribute 1 vector 322, ..., the source entity universal attribute M vector 332, the target entity universal attribute 1 vector 324, ..., the target entity universal attribute M vector 334), and the universal entity image vector differences (e.g., the universal entity image vector difference 354, the universal entity text vector difference 362, the universal entity attribute 1 vector difference 372, ..., the universal entity attribute M vector difference 382, etc.) may be inputs to the concatenate block 402, which may generate a concatenated vector 410 by concatenated the input vectors with one another. In this manner, the concatenated vector 410 may represent values of the input vectors (e.g., to the fifth ML layer 160 of FIG. 1), allowing for a hybrid analysis of both the similarity and difference data for the source and target brands to determine whether the source and target brands are the same.

Figure 5:
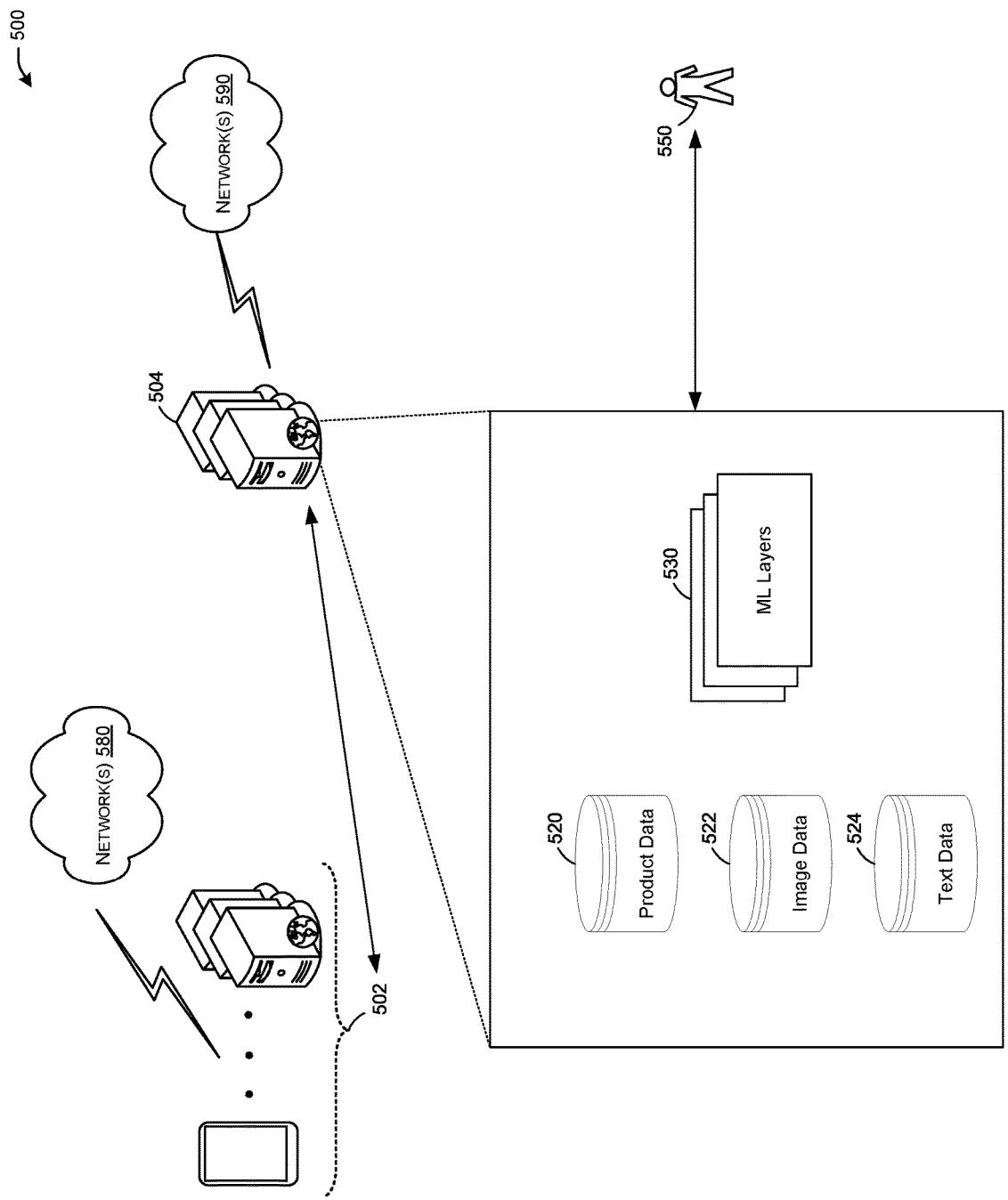
FIG. 5 illustrates an example system for brand matching using multi-layer machine learning, in accordance with one or more example embodiments of the present disclosure.

Still referring to FIG. 4, the concatenated vector 410 may be input to a FFN 420 (e.g., part of the fifth ML layer 160 of FIG. 1) to analyze and generate a relationship score 430 indicating (e.g., using a score from 0-1) how likely the source and target brand (or other source and target entity) are to be the same brand or other entity, and/or how likely the source and target entity are to have one or more relationships (e.g., parent-child, homonym, etc.). For example, because the concatenated vector 410 may have many aggregated values of the source and target brand, including values related to multiple products for the source and target brands, the FFN 420 may analyze the concatenated vector 410 to determine whether the values of the concatenated vector 410 indicate similarity or differences that are likely to indicate a brand match or mismatch. In particular, the FFN 420 may be trained with training data and/or may receive human operator feedback (e.g., as shown in FIG. 5) that may train the FFN 420 to generate the relationship score 430. For example, the training data may include data labeled as strongly matched source and target brand pairs (e.g., scores closer to 1), and data labeled as mismatched source and target brand pairs (e.g., scores closer to 0). The training data may include both text and image data for source and target brands and their products. Some labeled brand pairs may be used as training, while others may be used as test data.

In one or more embodiments, test data for scenarios without the twin neural networks of FIG. 3A and test data without the difference neural networks of FIG. 3B indicate that the hybrid model with both the twin neural networks of FIG. 3A and the difference neural networks of FIG. 3B show a stronger ability to properly identify brand matches and mismatches.

FIG. 5 illustrates an example system 500 for brand matching using multi-layer machine learning, in accordance with one or more example embodiments of the present disclosure.

Referring to FIG. 5, the system 500 may include devices 502 (e.g., client devices, server devices, etc.) that may communicate with a remote system 504 (e.g., to provide product data, brand data, etc. that may represent the inputs to the ML layers shown in FIGS. 1, 2A, and 2B). The remote system 504 may store product data 520 (e.g., product information, brand information, etc.), image data 522, and text data 524 (e.g., using databases or other data storage). The product data 520, image data 522, and text data 524 may represent the inputs to the ML layers shown in FIGS. 1, 2A, and 2B. The remote system 504 may include ML layers 530 (e.g., the ML layers of FIG. 1, the SBERTs and DANs of FIGS. 2A and 2B, the twin neural networks of FIG. 3A, the difference neural networks of FIG. 3B, the concatenate block 402 and the FFN 420 of FIG. 4). The ML layers 530 may be used to analyze the product data 520, image data 522, and text data 524 to determine whether brands, products, or the like are the same as one another (e.g., whether a target brand and source brand are the same based on the respective product data for products of the source and target brands).

Still referring to FIG. 5, a human operator 550 may provide training data as described above, and feedback (e.g., regarding whether the ML layers 530 have properly identified a match or mismatch) to the remote system 504 (e.g., the remote system 504 may provide the data inputs to and the data outputs from the ML layers 530 to the human operator 550 for analysis). In this manner, the ML layers 530 may be trained to identify matches and mismatches, and may adjust criteria (e.g., threshold values, etc.) for analyzing data to identify matches and mismatches based on whether the matching scores (e.g., the match score 430 of FIG. 4) is accurate and precise, and based on training data.

In one or more embodiments, the devices 502 may provide product and brand data to the remote system 504 (e.g., the product data 520, image data 522, and text data 524). For example, the devices 502 may request to market and sell products having one or more brands. The remote system 504 may analyze the product and brand data for any new products or brands provided by the devices 502 (e.g., source products/brands), and may compare the source products and brands to target products/brands (e.g., products/brands whose data is already stored by the remote system 504). In this manner, "new" branded products added to the remote system 504 may be compared to "known" branded products (e.g., using the ML layers 530) to determine whether the new branded products are represented by known brand already marketed and sold using the remote system 504 (e.g., when the match score 430 of FIG. 4 exceeds a threshold value), and when the new branded products are represented by a new brand not currently marketed and sold using the remote system 504 (e.g., when the match score 430 fails to exceed a threshold value).

In one or more embodiments, the match scoring performed by the ML layers 530 may not be limited to products and their brands. Other categories of data may be analyzed using the hybrid model of the ML layers 530 to determine whether two types of data are likely to be matches or mismatches. For example, video titles, book titles, audio titles, and the like may be analyzed for matches. Using the video title example, text inputs including a name of a movie or program, a description of a movie or program, an image from the movie or program, etc. (e.g., text and/or image data) may be input to the ML layers 530 similar to what is shown in FIGS. 2A and 2B to generate universal embeddings to use as inputs to the combined twin neural networks and difference neural networks. In this manner, when the devices 502 provide a new video title to the remote system 504, the remote system 504 may determine whether the new video title matches an existing video title (e.g., in another language, from a movie or television series, from a particular content provider, etc.).

Any of the devices 502 and or the remote system 504 may be configured to communicate with each other via one or more communications networks 580 and/or 590 wirelessly or wired. Any of the communications networks 580 and/or 590 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 580 and/or 590 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 580 and/or 590 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 6:
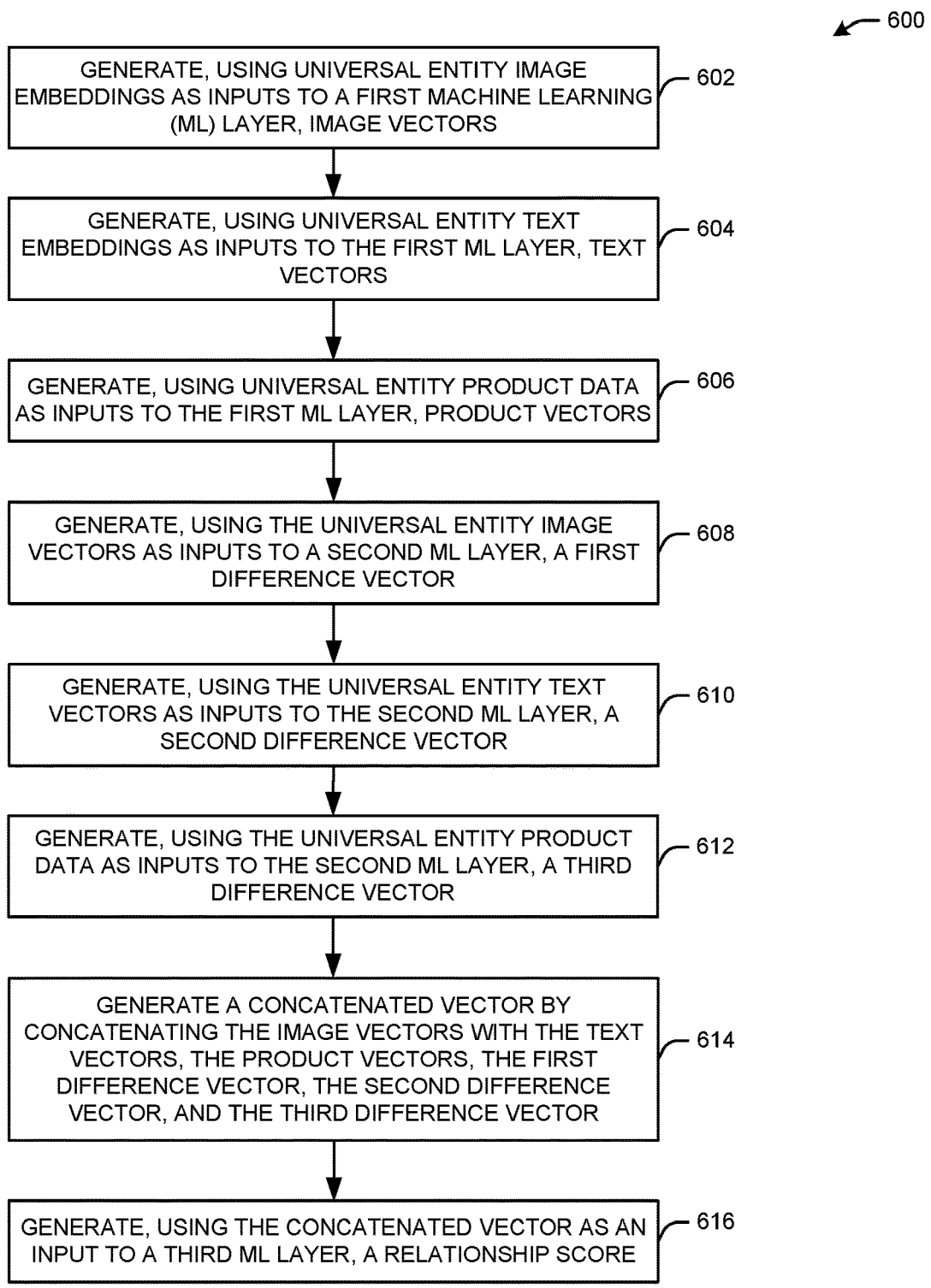
FIG. 6 illustrates a flow diagram for a process for brand matching using multi-layer machine learning, in accordance with one or more example embodiments of the present disclosure.

FIG. 6 illustrates a flow diagram for a process 600 for brand matching using multi-layer machine learning, in accordance with one or more example embodiments of the present disclosure.

At block 602, a system (e.g., the remote system 504 of FIG. 5) may generate, using universal entity image embeddings (e.g., the source entity universal image vector 206 of FIG. 2A, the target entity universal image vector 256 of FIG. 2B) as inputs to a first ML layer (e.g., the twin neural network 302 of FIG. 3A), image vectors (e.g., the source entity universal image vector 304 of FIG. 3A, the target entity universal image vector 306 of FIG. 3B) as outputs of the first ML layer. The universal entity image embeddings may represent the universal image embeddings of a source entity and a target entity, respectively. For example, when the entities are brands having multiple products, the universal source entity image embeddings may be based on the image data of the products of the source entity, and the universal target entity image embeddings may be based on the image data of the products of the target entity.

At block 604, the system may generate, using universal entity text embeddings (e.g., the source entity universal text vector 212 of FIG. 2A, the target entity universal text vector 262 of FIG. 2B) as inputs to the first ML layer (e.g., the twin neural network 310, being the same layer as the twin neural network 302 of FIG. 3A), text vectors (e.g., the source entity universal text vector 312 of FIG. 3A, the target entity universal text vector 314 of FIG. 3A) as outputs of the first ML layer.

At block 606, the system may generate, using universal entity product data (e.g., the source entity universal attribute vectors of FIG. 2A, the target entity universal attribute vectors of FIG. 2B) as inputs to the first ML layer (e.g., the twin neural network 320 of FIG. 3A, the twin neural network 330 of FIG. 3B, being the same layer as the twin neural network 310 of FIG. 3A and the twin neural network 302 of FIG. 3A), product vectors (e.g., the source entity universal attribute vectors of FIG. 3A, the target entity universal attribute vectors of FIG. 3A). For example, the universal entity product data may include a first universal product name embedding (e.g., vector) for a source entity, and a second universal product name embedding (e.g., vector for a target entity. The universal entity product data may be generated from another ML layer (e.g., the SBERTs of FIGS. 2A and 2B), which may analyze product attribute text strings (e.g., the source item attributes of FIG. 2A, the target item attributes of FIG. 2B). The product vectors may be universal embeddings for a source (e.g., a new) entity, and for a target (e.g., an existing) entity. The system may compare the product vectors of the source and target entities to determine whether the source and target have a relationship.

At block 608, the system may generate, using the universal entity image vectors as inputs to a second ML layer (e.g., the difference neural network 352 of FIG. 3B), a first difference vector (e.g., the universal entity image vector difference 354 of FIG. 3B). At block 610, the system may generate, using the universal entity text vectors as inputs to the second ML layer (e.g., the difference neural network 360 of FIG. 3B, being the same layer as the difference neural network 352 of FIG. 3B), a second difference vector (e.g., the universal entity text vector difference 362 of FIG. 3B). At block 612, the system may generate, using the universal entity product data as inputs to the second ML layer (e.g., the difference neural networks 370 and 380 of FIG. 3B, being the same layer as the difference neural networks 352 and 360 of FIG. 3B), a third difference vector (e.g., the universal entity attribute 1 vector difference 372, the universal entity attribute M vector difference 382).

At block 614, the system may generate a concatenated vector (e.g., the concatenated vector 410 of FIG. 4) by concatenating the image vectors, the text vectors, the product vectors, and the difference vectors. At block 616, the system may use the concatenated vector as an input to a third ML layer (e.g., the FFN 420 of FIG. 4), which may generate a relationship score (e.g., the relationship score 430 of FIG. 4) indicating how likely the source and target are to share a brand or have another entity relationship.

The examples presented herein are not intended to be limiting.

Figure 7:
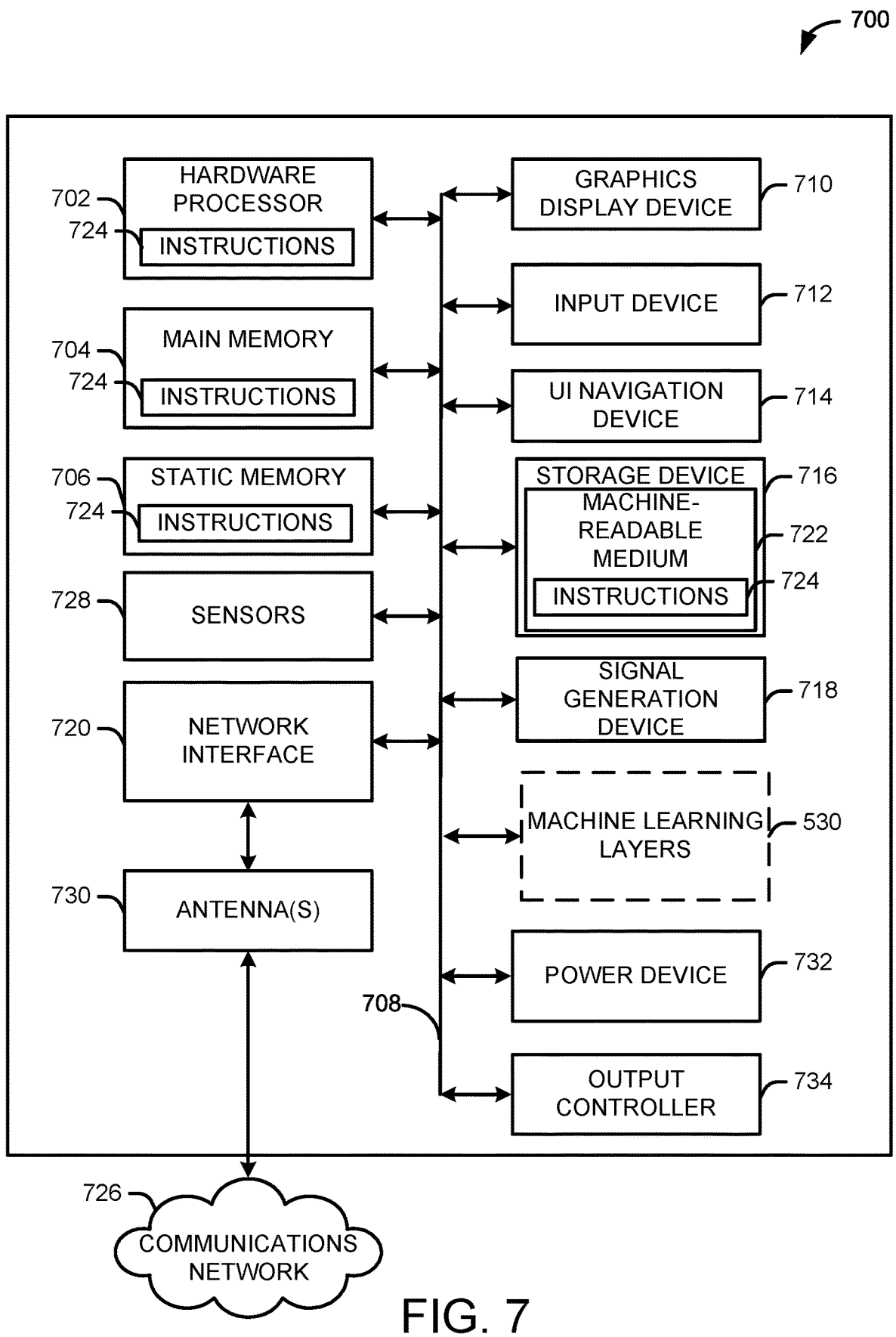
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 (e.g., the devices 502 of FIG. 5, the remote system 504 of FIG. 5) or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in Wi-Fi direct, peer-to-peer (P2P) (or other distributed) network environments. The machine 700 may be a server, a media device, a remote control device, a streaming media device, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a tensor processing unit (TPU) having an artificial intelligence accelerator application-specific integrated circuit (ASIC), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker, emitters, etc.), the ML layers 530 of FIG. 5, a network interface device/transceiver 720 coupled to antenna(s) 730, and one or more sensors 728. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a media device, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The invention claimed is:

1. A method comprising:
generating, based on a first universal image embedding and a second universal image embedding as inputs to a twin neural network, a first image vector associated with a first brand and a second image vector associated with a second brand, the first universal image embedding associated with the first brand and the second universal image embedding associated with the second brand;
generating, based on a first universal text embedding and a second universal text embedding as inputs to the twin neural network, a first text vector associated with the first brand and a second text vector associated with the second brand, the first universal text embedding associated with the first brand and the second universal text embedding associated with the second brand;
generating, based on a first universal name vector of a first product and a second universal name vector of a second product as inputs to the twin neural network, a third text vector associated with the first brand and a fourth text vector associated with the second brand, the first universal name vector associated with the first brand and the second universal name vector associated with the second brand;
generating, based on the first universal image embedding and the second universal image embedding as inputs to a difference neural network, a first difference vector indicative of a difference between the first universal image embedding and the second universal image embedding;
generating, based on the first universal text embedding and the second universal text embedding as inputs to the difference neural network, a second difference vector indicative of a difference between the first universal text embedding and the second universal text embedding;
generating, based on the first universal name vector and the second universal name vector as inputs to the difference neural network, a third difference vector indicative of a difference between the first universal name vector and the second universal name vector;
generating a concatenated vector by concatenating the first image vector to the second image vector, the first text vector, the second text vector, the first name vector, the second name vector, the first difference vector, the second difference vector, and the third difference vector;
generating, based on the concatenated vector as an input to a feedforward neural network (FFN), a score between zero and one, the score indicative of a relationship between the first brand and the second brand.

2. The method of claim 1, further comprising:
generating the first universal image embedding as a first output of a deep averaging network (DAN);
generating the second universal image embedding as a second output of the DAN;
generating the first universal text embedding as a third output of the DAN;
generating the second universal text embedding as a fourth output of the DAN;
generating the first universal name vector as a first output of a sentence-based bidirectional encoder representation (SBERT); and generating the second universal name vector as a second output of the SBERT.

3. The method of claim 1, further comprising:
generating, based on a first universal brand description vector of the first brand and a second universal brand description vector of the second brand as inputs to the twin neural network, a third brand description vector associated with the first brand and a fourth brand description vector associated with the second brand; and
generating, based on the first universal brand description vector and the second universal brand description vector as inputs to the difference neural network, a fourth difference vector indicative of a difference between the first universal brand description vector and the second universal brand description vector,
wherein concatenated vector further comprises the fourth difference vector.

4. The method of claim 1, further comprising:
generating, based on a first universal brand name vector of the first brand and a second universal brand name vector of the second brand as inputs to the twin neural network, a third brand name vector associated with the first brand and a fourth brand name vector associated with the second brand; and
generating, based on the first universal brand name vector and the second universal brand name vector as inputs to the difference neural network, a fourth difference vector indicative of a difference between the first universal name vector and the second universal brand name vector,
wherein concatenated vector further comprises the fourth difference vector.

5. A method comprising:
generating, based on a first universal embedding vector and a second universal embedding vector as inputs to a twin neural network, a third universal embedding vector and a fourth universal embedding vector;
generating, based on the first universal embedding vector and the second universal embedding vector as inputs to a difference neural network, a difference vector indicative of a difference between the first universal embedding vector and the second universal embedding vector;
generating a concatenated vector by concatenating the third universal embedding vector with the fourth universal embedding vector and the difference vector;
generating, based on the concatenated vector as an input to a feedforward neural network (FFN), a score between zero and one, the score indicative of a relationship between a first entity and a second entity, the first entity associated with the first universal embedding vector and the second entity associated with the second universal embedding vector.

6. The method of claim 5, further comprising:
generating the first universal embedding vector as a first output of a deep averaging network (DAN); and
generating the second universal embedding vector as a second output of the DAN.

7. The method of claim 6, further comprising:
generating the first output of the DAN based on a fifth embedding vector and a sixth embedding vector as inputs to a sentence-based bidirectional encoder representation (SBERT); and
generating the second output of the DAN based on a seventh embedding vector and an eighth embedding vector as inputs to the SBERT,
wherein the fifth embedding vector and the seventh embedding vector are associated with a first product, and
wherein the sixth embedding vector and the eighth embedding vector are associated with a second product.

8. The method of claim 5, further comprising:
generating the first universal embedding vector as a first output of a DAN based on a fifth embedding vector, a sixth embedding vector, and a seventh embedding vector as inputs to the DAN,
wherein the fifth embedding vector is associated with a first product, the sixth embedding vector is associated with a second product, and the seventh embedding vector is associated with a third product.

9. The method of claim 5, further comprising:
generating, based on a fifth universal embedding vector and a sixth universal embedding vector as inputs to the twin neural network, a seventh universal embedding vector and an eighth universal embedding vector, the fifth universal embedding vector associated with the first entity and the sixth universal embedding vector associated with the second entity; and
generating, based on the fifth universal embedding vector and the sixth universal embedding vector as inputs to the difference neural network, a second difference vector indicative of a difference between the fifth universal embedding vector and the sixth universal embedding vector,
wherein the concatenated vector comprises the seventh universal embedding vector, the eighth universal embedding vector, and the second difference vector,
wherein the first universal embedding vector and the second universal embedding vector are associated with a first type of data, and
wherein the fifth universal embedding vector and the sixth universal embedding vector are associated with a second type of data different than the first type of data.

10. The method of claim 5, wherein the first universal embedding vector comprises a first universal image embedding for the first entity, and wherein the second universal embedding vector comprises a second image embedding for the second entity.

11. The method of claim 5, wherein the first universal embedding vector comprises a first universal item name embedding associated with the first entity.

12. The method of claim 5, wherein the first universal embedding vector comprises a first universal brand description embedding, and wherein the second universal embedding vector comprises a second universal brand description embedding.

13. The method of claim 5, wherein the first universal embedding vector comprises a first universal product description embedding, and wherein the second universal embedding vector comprises a second universal product description embedding.

14. The method of claim 5, wherein the first universal embedding vector comprises a first universal brand name embedding, and wherein the second universal embedding vector comprises a second universal brand name embedding.

15. The method of claim 5, wherein the relationship comprises a parent-child relationship, a homonym relationship, or a same-entity relationship.

16. A system comprising:
a twin neural network that receives a first universal embedding vector and a second universal embedding vector as inputs, and that generates a third universal embedding vector and a fourth universal embedding vector as outputs;

a difference neural network that receives the first universal embedding vector and the second universal embedding vector as inputs, and that generates a difference vector indicative of a difference between the first universal embedding vector and the second universal embedding vector; and a feedforward neural network (FFN) that generates a concatenated vector by concatenating the third universal embedding vector with the fourth universal embedding vector and the difference vector, and that generates, based on the concatenated vector, a score between zero and one, the score indicative of a relationship between a first brand and a second brand, the first brand associated with the first universal embedding vector and the second brand associated with the second universal embedding vector.

17. The system of claim 16, further comprising:
a deep averaging network (DAN) that generates the first universal embedding vector as a first output and that generates the second universal embedding vector as a second output.

18. The system of claim 17, further comprising:
a sentence-based bidirectional encoder representation (SBERT) that receives a fifth embedding vector and a sixth embedding vector as inputs, wherein an output of the SBERT is an input to the DAN, and wherein the first universal embedding vector is generated by the DAN based on the input,
wherein the fifth embedding vector is associated with a first product, and
wherein the sixth embedding vector is associated with a second product.

19. The system of claim 16, further comprising a DAN, wherein:
the DAN generates the first universal embedding vector as a first output based on a fifth embedding vector, a sixth embedding vector, and a seventh embedding vector as inputs to the DAN, and
the fifth embedding vector is associated with a first product, the sixth embedding vector is associated with a second product, and the seventh embedding vector is associated with a third product.

20. The system of claim 16, wherein:
the twin neural network generates, based on a fifth universal embedding vector and a sixth universal embedding vector as inputs, a seventh universal embedding vector and an eighth universal embedding vector, the fifth universal embedding vector associated with the first brand and the sixth universal embedding vector associated with the second brand,
the difference neural network generates, based on the fifth universal embedding vector and the sixth universal embedding vector as inputs, a second difference vector indicative of a difference between the fifth universal embedding vector and the sixth universal embedding vector,
the concatenated vector comprises the seventh universal embedding vector, the eighth universal embedding vector, and the second difference vector,
the first universal embedding vector and the second universal embedding vector are associated with a first type of data, and
the fifth universal embedding vector and the sixth universal embedding vector are associated with a second type of data different than the first type of data.

* * * * *